(12) United States Patent
Peiter et al.

(10) Patent No.: US 9,766,150 B2
(45) Date of Patent: Sep. 19, 2017

(54) MOUNTING DEVICE FOR A ROTARY SPINDLE OF A BALANCING MACHINE

(71) Applicant: Schenck RoTec GmbH, Darmstadt (DE)

(72) Inventors: Dieter Peiter, Rossdorf (DE); Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 241 days.

(21) Appl. No.: 14/604,952

(22) Filed: Jan. 26, 2015

(65) Prior Publication Data
US 2015/0209868 A1 Jul. 30, 2015

(30) Foreign Application Priority Data

Jan. 28, 2014 (DE) .................. 10 2014 101 003

(51) Int. Cl.
*B23B 31/26* (2006.01)
*G01M 1/04* (2006.01)

(52) U.S. Cl.
CPC ............. *G01M 1/04* (2013.01); *B23B 31/265* (2013.01); *B23B 2265/32* (2013.01); *B23B 2265/326* (2013.01); *B23B 2265/34* (2013.01); *B23B 2270/60* (2013.01); *Y10T 279/1008* (2015.01); *Y10T 279/1045* (2015.01);
(Continued)

(58) Field of Classification Search
CPC .... G01M 1/04; B23B 31/265; B23B 2265/32; B23B 2270/60; Y10T 409/309408; Y10T 409/30952; Y10T 279/1008; Y10T 279/1045
See application file for complete search history.

(56) References Cited

U.S. PATENT DOCUMENTS 3,630,534 A * 12/1971 Better ................... B23B 31/117
279/102
4,630,980 A * 12/1986 Kubo .................... B23B 31/113
279/101
(Continued)

FOREIGN PATENT DOCUMENTS

DE 4127661 A1 * 2/1993 ........... B23B 29/046
DE 195 21 993 A1 1/1997
(Continued)

OTHER PUBLICATIONS

E. Filemon, Production and Analysis of Polygon Profiles, Periodica Polytechnica M III/I, Sep. 18, 1958, pp. 81-112.
(Continued)

*Primary Examiner* — Eric A Gates
(74) *Attorney, Agent, or Firm* — Collard & Roe, P.C.

(57) ABSTRACT

Disclosed is a mounting device (6) including a receiving opening (8) with a circular inner locating surface (10) which is coaxial with the axis of rotation (3) and serves for engagement with radially outer vertices (24) of the polygon profile of a holding pin (23). Arranged adjacent to the inner locating surface is a positioning disk (14) which has an opening (15) coaxial with the axis of rotation (3) and of such polygonal shape and size that the polygon profile of the holding pin (23) engaging in the opening (15) is supported in the opening (15) in a manner preventing relative rotation.

7 Claims, 2 Drawing Sheets

(52) U.S. Cl.
CPC ...... *Y10T 279/17* (2015.01); *Y10T 409/30952* (2015.01); *Y10T 409/309408* (2015.01)

(56) References Cited

U.S. PATENT DOCUMENTS

| | | | | |
|---|---|---|---|---|
| 4,844,671 | A * | 7/1989 | Reinauer | B23B 31/261 408/239 R |
| 4,978,262 | A * | 12/1990 | Tjernstrom | B23B 31/261 279/2.12 |
| 5,346,344 | A * | 9/1994 | Kress | B23B 29/046 279/2.12 |
| 5,443,340 | A * | 8/1995 | Reinauer | B23B 31/261 408/239 R |
| 5,954,347 | A | 9/1999 | Buck et al. | |
| 6,339,868 | B1 * | 1/2002 | Nagaya | B23B 31/1179 279/102 |
| 6,612,791 | B1 | 9/2003 | Haimer | |
| 7,101,127 | B2 * | 9/2006 | Kimura | B23B 31/06 408/239 A |
| 7,284,938 | B1 * | 10/2007 | Miyazawa | B23B 31/006 409/141 |
| 8,376,671 | B2 * | 2/2013 | Kaneko | B23Q 3/15546 279/126 |
| 2008/0203680 | A1 * | 8/2008 | Rohm | B23B 31/006 279/74 |
| 2010/0201083 | A1 * | 8/2010 | Hangleiter | B23B 31/265 279/50 |
| 2011/0233839 | A1 * | 9/2011 | Haimer | B23B 31/113 269/57 |

FOREIGN PATENT DOCUMENTS

| | | | |
|---|---|---|---|
| DE | 102007007890 A1 * | 8/2008 | ............ B23B 31/02 |
| DE | 10 2012 015 815 A1 | 2/2014 | |
| WO | 00/45983 A1 | 8/2000 | |

OTHER PUBLICATIONS

General Polygon Systems—Innovative Engineering, http://generalpolygon.com/history.htm, downloaded Dec. 16, 2016, 1 page.
Polygon Profiles—Design Descriptions, http://www.generalpolygon.com/profiles.htm, downloaded Dec. 16, 2016, 2 pages.
Polygon Design Data, Stoffel Polygon Systems, Inc., downloaded Dec. 15, 2016, 5 pages.
Shaft-hub Connections, Inkoma-Group, Jan. 2014, pp. 357-388.

* cited by examiner

MOUNTING DEVICE FOR A ROTARY SPINDLE OF A BALANCING MACHINE

CROSS REFERENCE TO RELATED APPLICATIONS

Applicants claim priority under 35 U.S.C. §119 of German Application No. 10 2014 101 003.5 filed Jan. 28, 2014.

FIELD OF THE INVENTION

This invention relates to a mounting device for a rotary spindle of a balancing machine, with a receiving opening for receiving a polygon-profile holding pin of a rotary body to be balanced.

BACKGROUND OF THE INVENTION

WO 00/45983 A1 discloses a mounting device of the type referred to for clamping a toolholder, in which a base unit attached to a machine spindle driven for rotation about an axis of rotation includes a receiving opening centrally located with respect to the axis of rotation and adapted to receive axially therein a coupling shaft of the toolholder of circular cross-section. The receiving opening is provided with mating surfaces suitable for engagement with complementary counter-mating surfaces of the coupling shaft. Arranged in the receiving opening is a collet which acts on the coupling shaft and is actuatable by a collet actuator axially adjustably guided relative to the base unit.

Holding pins of rotary bodies which serve to receive the rotary bodies during balancing are frequently part of a torque-transmitting shaft-to-hub connection and may be provided with a polygon profile for the purpose of torque transmission. One application example of a polygon design of holding pins are polygonal hollow tapered shanks with plane contact surface to DIN-ISO 26623. Polygonal hollow tapered shanks enable precise location and axial positioning as well as precise angular positioning in the receiving opening on the spindle of a machine tool, which receiving opening is provided with a mating polygonal hollow shape.

Tools rotating at high rotational speeds are generally balanced in a balancing machine in order to avoid undue loads on the machine tool's spindle caused by unbalance, and impairment of the machining quality. The demands placed on the balancing quality of such tools are high and require precise, centered clamping of the tools to be balanced or of the toolholder carrying them in the mounting device arranged on the spindle of the balancing machine.

For the mounting of holding pins provided with a polygon profile, for example, tools or toolholders having a polygonal hollow tapered shank, in a balancing machine, mounting devices are known having a receiving opening provided with a mating polygonal inner contour. In view of the high accuracy demanded for precise, accurately centered mounting, the manufacture of such mounting devices equipped with the appropriate polygonal inner contour is very expensive.

SUMMARY OF THE INVENTION

It is an object of the present invention to provide a mounting device for a rotary spindle of a balancing machine with a receiving opening for receiving a polygon-profile holding pin, which affords greater economy of manufacture.

According to the present invention, a mounting device for a rotary spindle of a balancing machine includes a receiving opening with a circular inner locating surface coaxial with the axis of rotation and serving for engagement with radially outer vertices of the polygon profile of a holding pin. In addition, the mounting device is provided with a positioning disk arranged adjacent to the inner locating surface and having an opening coaxial with the axis of rotation and of such polygonal shape and size that the polygon profile of the holding pin engaging in the opening is supported in the opening in a manner preventing relative rotation.

The present invention is based on the realization that the forces and moments acting in a balancing machine on a toolholder or comparable holding pin received therein are by far lower than when received in a machine tool. Accordingly, central location in the receiving opening in the balancing machine is only possible by means of the vertices of the polygon, which suffices to reliably transmit the forces and moments occurring in the balancing machine. For this purpose, it is sufficient for the inner locating surface to have a circular inner contour of cylindrical or conical configuration, depending on the application, which affords great ease and economy of manufacture.

The circular inner locating surface offers, however, no angular orientation which is required in a balancing machine for angle assignment of the unbalance vector. The required accuracy of angle assignment is however far lower than the accuracy requirements of the majority of machine tools and may amount to +/−0.5°, for example. According to the present invention, the angle assignment for the balancing operation is accomplished by the positioning disk. A positioning disk satisfying the accuracy requirements of the balancing process is very simple and economical to manufacture, for example, by cutting it out with a laser cutting device.

The mounting device of the present invention may be an integral part of the spindle of a balancing machine. Alternatively, it may be formed as an insert detachably connected to the balancing machine.

According to the invention, the positioning disk is preferably a component manufactured separately, being arranged on a shoulder of the receiving opening adjacent to the inner locating surface and secured to the mounting device in a manner preventing relative rotation. The opening of the positioning disk may have the same shape as the polygon profile or differ from it in part. The even pitch of a conventional polygon profile, for example, a 3-gon or a 4-gon, enables the holding pin to be turned through the pitch angle, hence allowing a 120° or 90° or 180° index balancing operation. Advantageously, the opening has a shape enabling the polygon profile of the holding pin to be non-rotatably supported on the positioning disk in a first angular position and in a second angular position turned through 180° also in cases where the polygonal contour has an uneven pitch. This makes it possible to apply the 180° index balancing procedure as is customary in balancing, using, for example, a 3-gon.

For axially positioning the rotary body to be balanced, the mounting device may include a plane seating surface for a shoulder of the rotary body. Furthermore, the receiving opening may accommodate a clamping device for clamping the holding pin received as, for example, a hollow tapered shank.

BRIEF DESCRIPTION OF THE DRAWINGS

An embodiment of the present invention is illustrated in the accompanying drawing and will be described in greater detail in the following. In the drawing.

DETAILED DESCRIPTION OF THE DRAWINGS

Figure 1:
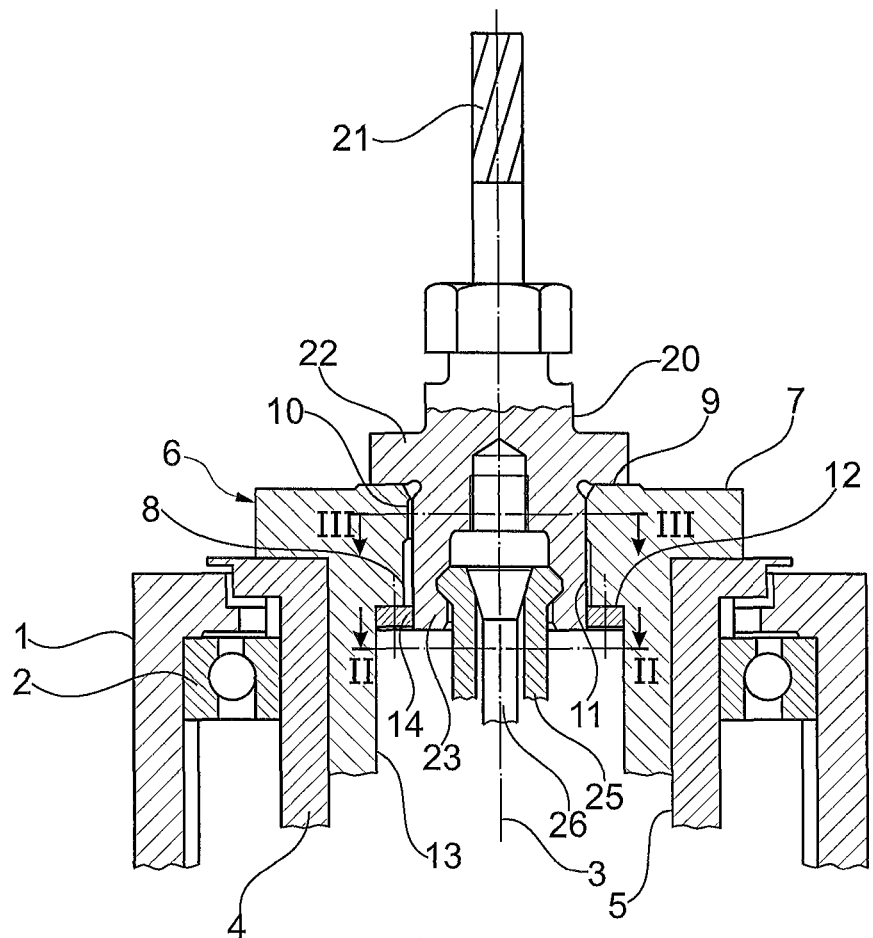
FIG. 1 is a cross-sectional view of the spindle of a balancing machine, showing a mounting device arranged therein and a toolholder arranged in the mounting device.

FIG. 1 shows a housing part 1 of a balancing machine having a spindle 4 carried therein for rotation about an axis of rotation 3 by means of rolling bearings 2. For dynamic unbalance measurement, the spindle 4 is drivable into rotary motion by means of a motor. Arranged in a central bore 5 of the spindle 4 is a mounting device 6 which is configured as an exchangeable insert. The mounting device 6 includes a flange 7 secured to the frontal end of the spindle 4 by means of screws. The mounting device 6 has a central receiving opening 8, and on its frontal end a plane, annular seating surface 9. The receiving opening 8 has at its end adjacent to the plane seating surface 9 a coaxial locating surface 10 and, adjoining the latter inwardly, a circular cylindrical transition surface 11 of a diameter greater than the locating surface 10. The transition surface 11 terminates on a radial shoulder 12 which is adjoined by an inner cylindrical bore portion 13 coaxial with the axis of rotation 3. The bore portion 13 accommodates a positioning disk 14 having an opening 15. The positioning disk 14 has a cylindrical envelope surface 16 causing it to be centrally located in the bore portion 13. The positioning disk 14 abuts the shoulder 12 and is fixedly connected with the mounting device 6 by screws 17 parallel to the axis.

Arranged in the receiving opening 8 of the mounting device 6 is a toolholder 20 carrying a tool 21. The toolholder 20 has a shoulder 22 in abutting engagement with the plane seating surface 9 and includes a holding pin 23 constructed as a polygonal hollow tapered shank which extends through the receiving opening 8 and with its inner end into the opening 15 of the positioning disk 14.

Figure 2:
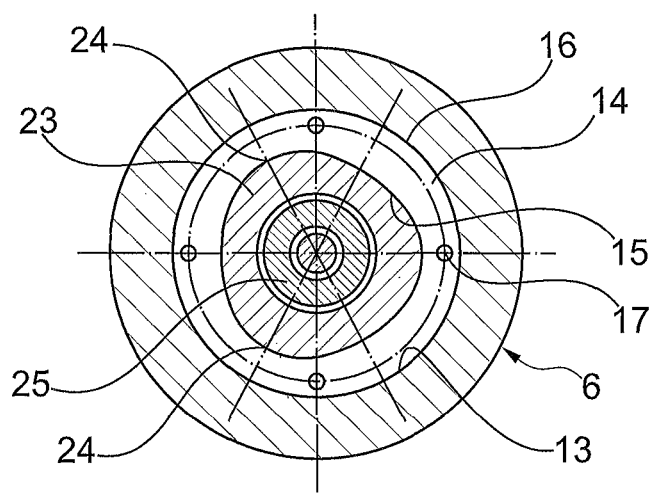
FIG. 2 is a cross-sectional view of the mounting device taken along line II-II of FIG. 1.
Figure 3:
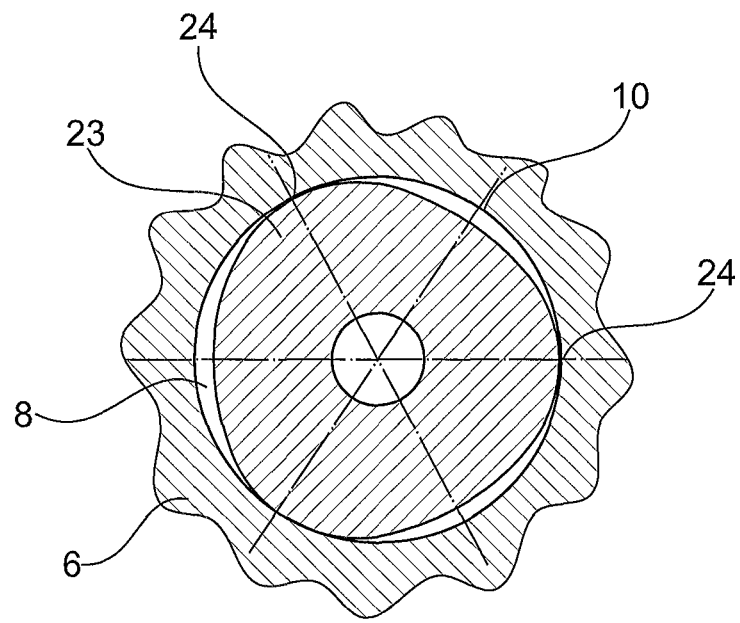
FIG. 3 is a cross-sectional view of the mounting device taken along line III-III of FIG. 1.

The holding pin 23 is conical and, as becomes apparent from FIGS. 2 and 3, has a trigonal polygon profile formed of eccentric circular arcs of differing diameter and known by the standard designation P3G. The locating surface 10 is configured in the shape of a circular section of a cone envelope, its inclination and radius matching the inclination and the center-to-center distance of the vertices 24 of the holding pin 23 in such fashion as to cause the locating surface 10 to center the holding pin 23 to the required precision. FIG. 3 shows the points of contact where the more pronounced curvatures of the polygon profile of the holding pin 23 rest against the lesser pronounced curvatures of the locating surface 10.

As FIG. 2 shows, the opening 15 in the positioning disk 14 is provided with the hub profile matching the profile of the holding pin 23, thereby ensuring a non-rotatable support of the toolholder 20 in the mounting device 6 with defined angle assignment. Considering that three mounting positions are possible, it is recommended to add an external marking to identify the selected mounting position. The accuracy demands of such a marking are however low.

To clamp the toolholder 20 into place in the receiving opening 8, the spindle 4 houses a clamping device 25 which engages in an undercut groove in a bore of the toolholder 20 and is capable of being actuated by means of an actuating rod 26.

Figure 4:
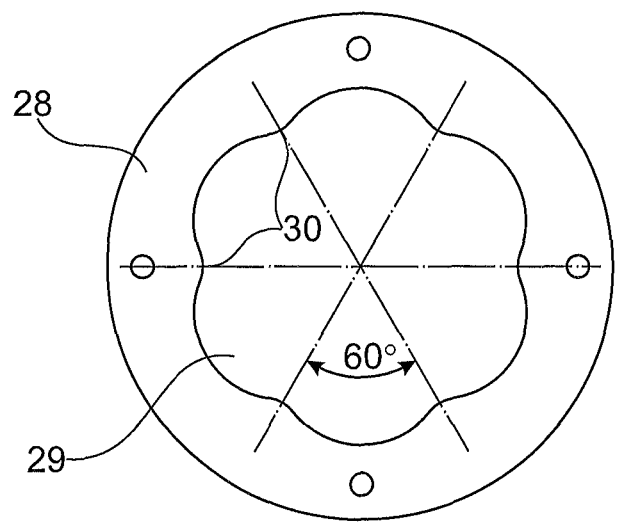
FIG. 4 is a view of a positioning disk showing an embodiment with a hexagonal opening capable of receiving a trigonal holding pin in a first angular position and in a second angular position turned through 180°.

FIG. 4 shows a second embodiment of a positioning disk 28 suitable for insertion into the mounting device 6 in lieu of the positioning disk 14. The positioning disk 28 has an opening 29 with a polygonal inner contour divided evenly into six profile sections 30. Each of the profile sections 30 including an angle of 60° is shaped in the form of a correspondingly large section of the outer contour of the pin profile in the center of which a vertex 24 of the pin profile lies. The opening 29 divided into six sections enables the polygonal holding pin 23 to be received in two positions turned relative to one another by 180°. In this manner it is possible to balance the toolholder 20 by index balancing, that is, by performing a first measurement run in a first mounting position, and a second measurement run in a second mounting position indexed at 180°. With such an approach (index balancing) it is possible to detect and compensate for errors caused by the mounting in the balancing machine.

The mounting device disclosed in the present invention is suitable for equally thick and conical holding pins with a polygonal cross-sectional profile. The cross-sectional profile may have three or a greater or smaller number of vertices. The "polygonal" cross-sectional profile is not a precise geometrical polygon with sharp corners. The polygon corners and sides correspond to a trochoidal curve and are well rounded as lobes, as illustrated, in the manner well known in the art as disclosed in U.S. Pat. No. 3,630,534 and as defined by standard DIN ISO 26623. The polygon profile of this kind is commonly used in driving shaft and hub connections, in particular in mounting devices for mounting tool holders and driving spindles. For the mounting device to mount a particular profile, it is only necessary according to the invention to match the inner diameter of the locating surface and the inner contour of the positioning disk to this particular profile. Both these requirements can be met in simple and economical manner.

What is claimed is:

1. A mounting device for a rotary spindle of a balancing machine, with a central receiving opening for receiving a holding pin of substantially polygon profile of a rotary body to be balanced, the central receiving opening comprising a circular inner locating surface having a central axis that is coaxial with the axis of rotation of the spindle and adapted to directly contact a plurality of radially outer vertices of the polygon profile of the holding pin such as to cause the inner locating surface to center the holding pin, and an inner cylindrical bore portion of a diameter greater than that of the inner locating surface which inner cylindrical bore portion accommodates a positioning disk arranged adjacent to the inner locating surface and secured to the mounting device in a manner preventing relative rotation, the positioning disk having an opening coaxial with the axis of rotation and of such shape and size that the polygon profile of the holding pin engaging in the opening is held in the opening in a manner preventing relative rotation.

2. The mounting device according to claim 1 wherein in the positioning disk is a component manufactured separately, being arranged on a shoulder of the receiving opening adjacent to the inner locating surface and supported on the mounting device in a manner preventing relative rotation.

3. The mounting device according to claim 1, wherein the opening of the positioning disk has the same shape as the polygon profile of the holding pin.

4. The mounting device according to claim 1 wherein the opening of the positioning disk is shaped in such a manner that the polygon profile of the holding pin is adapted to be non-rotationally supported on the positioning disk in a first angular position and in a second angular position turned through 180°.

5. The mounting device according to claim 1 wherein the mounting device includes a plane seating surface for a shoulder of the rotary body.

6. The mounting device according to claim 1 wherein the receiving opening accommodates a clamping device for clamping the holding pin.

7. Use of a mounting device according to claim 1 wherein the mounting device is arranged in an insert detachably connected to the spindle of a balancing machine.

* * * * *